Feb. 23, 1932.  N. C. JACKSON  1,846,488
VARIABLE PITCH PROPELLER
Filed March 17, 1930
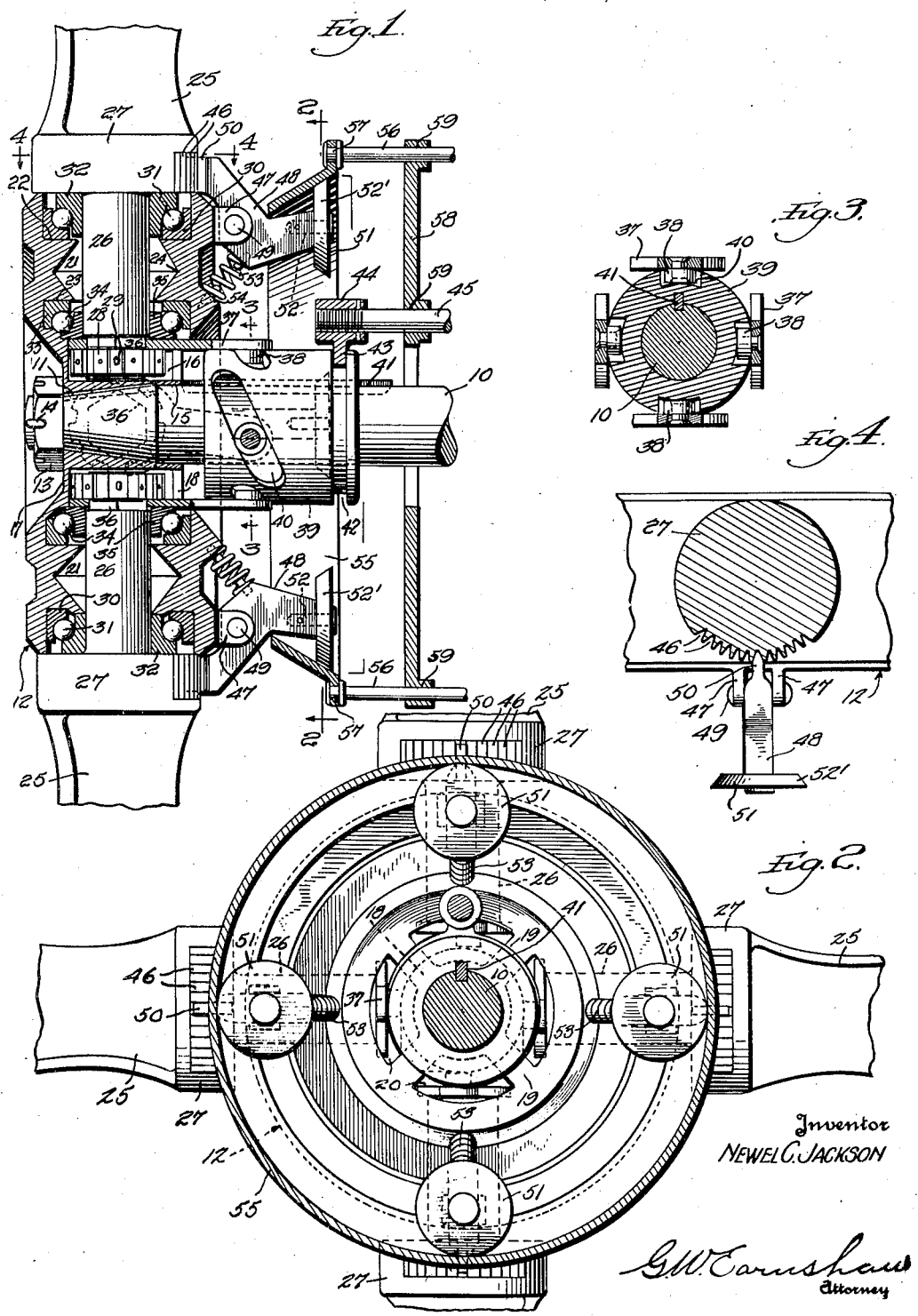
Inventor
NEWEL C. JACKSON
G. W. Earnshaw
Attorney Patented Feb. 23, 1932

1,846,488

UNITED STATES PATENT OFFICE

NEWEL C. JACKSON, OF CASSVILLE, MISSOURI

VARIABLE PITCH PROPELLER

Application filed March 17, 1930. Serial No. 436,564.

This invention relates to a variable pitch propeller particularly adapted for use with airplanes and the like.

An object of the invention is to provide a propeller construction wherein novel means are provided to vary the pitch of the blades.

A further object is to provide novel means for locking the blades in selected positions determined by the operation of the pitch varying means.

Other objects and advantages of the invention will become apparent during the course of the following description.

In the drawings I have shown a preferred embodiment of my invention. In this showing, Figure 1 is a central vertical sectional view through the propeller and adjacent parts, some parts being broken away and shown in elevation, Figure 2 is a sectional view taken substantially on line 2—2 of Figure 1, Figure 3 is a similar view taken substantially on line 3—3 of Figure 1, and, Figure 4 is a similar view taken substantially on line 4—4 of Figure 1.

Referring to the drawings, the numeral 10 indicates a drive shaft which may be suitably connected to be driven by the airplane motor, as will be understood. The shaft 10 is keyed as indicated at 11 to a hub portion indicated as a whole by the numeral 12. A nut or the like 13 is threaded upon the outer extremity of the shaft to prevent longitudinal movement thereof and if desired a cotter pin 14 may be used to securely lock the nut in position.

The hub portion 12 is circular in contour and is provided with a central opening 15 through which the shaft 10 extends. Outwardly of its central portion the hub is provided with an annular opening 16 which extends from a point adjacent the outer wall 17 of the hub to an integral web-like portion 18 formed in the inner wall of the hub. As shown the web portion is provided with spokes 19 or the like, spaced apart as indicated in Figure 2 to provide openings 20 communicating with the annular opening 16. I have illustrated the web as being formed with four spokes, but it will be obvious that as many spokes may be provided as may be desired.

The hub 12 is further provided with a plurality of radial openings 21 extending between the outer periphery thereof and the annular opening 16. One radial opening 21 is provided for each blade utilized in the propeller and in this instance, as there are four blades illustrated, there will, of course, be four of the openings 21. Each opening 21 is formed of relatively wide diameter adjacent its extremities to provide shoulders 22 and 23 respectively therein, and between the shoulders each radial opening is preferably cut diagonally as indicated at 24.

One propeller blade 25 is provided for each opening 21 and the shank 26 thereof extends through the opening. Each propeller blade is provided with an enlarged substantially circular portion 27 adjacent the outer end of its shank and is adapted to snugly engage the outer periphery of the hub as indicated in Figure 1. The inner extremity of each shank extends into the annular opening 16 and has a notched nut 28 or the like threaded thereon and secured in position by a cotter pin 29 or the like. Each nut 28 is notched as indicated in order to facilitate threading thereof onto the shank as it is somewhat difficult to reach the nut with the ordinary type wrench. However, with the notches arranged as indicated, a chisel or similar tool may be utilized to hammer the nut into proper position.

Each radial opening 21 has bearings for the shank arranged therein. As shown in Figure 1, a ball race 30 rests upon the shoulder 22 and carries balls 31 which are also engaged by a race 32 which surrounds the shank 26 and engages the circular portion 27 of the blade. Adjacent the lower extremity of the shank a ball race 33 similar to the race 30 is arranged against the shoulder 23 and balls 34 are carried between this race and a race 35 surrounding the shank of the blade, the latter race being similar to, but of less thickness than, the race 32.

Between each inner race 35 and its corresponding nut 28 the shanks are squared as indicated at 36 and an arm 37 is secured to each shank, each arm being provided with a squared opening whereby it may be received on the squared portion of the shank. Each arm 37 extends outwardly of the hub through the openings 20 between the spokes 19 and the outer end of each arm carries a roller or the like 38 for a purpose to be described.

A slidable sleeve 39 provided with a plurality of peripheral, diagonally arranged grooves 40 is keyed to the shaft 10 inwardly of the hub by means of a key 41 or the like, to prevent relative rotative movement between the shaft 10 and the sleeve. The sleeve 39 is however, mounted for sliding movement longitudinally of the shaft 10. One of the rollers 38 is arranged to ride in each groove 40 and it will be obvious that sliding movement of the sleeve 39 on the shaft 10 will cause the rollers 38 to move within the grooves 40. Every movement of the rollers 38 will change the positions of the arms 37 connected thereto and obviously the blades 25 will be rotated about their axes whereby the pitch thereof may be changed.

Any suitable means may be provided for sliding the sleeve 39. As shown, the sleeve is provided with an annular peripheral groove 42 in which the arms 43 of a yoke 44 are arranged. The yoke has one end of an operating rod 45, suitably secured therein and the opposite end of this rod may be extended to a location adjacent the pilot seat.

Novel locking means are provided in order to lock each blade in any selected position after the pitch thereof has been varied by rotation of the blade on its axis. The circular portion 27 of each blade is provided with a group of spaced peripheral openings 46 and the hub portion 12 is provided on its inner face with a pair of outstanding ears 47 arranged adjacent each group of openings 46. A locking member 48 is pivotally mounted as at 49 between each pair of ears 47 and one end of each member is provided with a preferably integral dog 50 adapted to be received in the openings 46. The opposite end of each locking member is provided with a roller 51 suitably secured thereto as indicated at 52 and the roller is beveled as indicated at 52'. Intermediate the ends of each locking member and inwardly of the pivot points thereof, a spring 53 is arranged between a cutout portion 54 of the hub and each locking member. Each spring 53 is arranged to exert an outward pressure on the locking member whereby each dog 50 will be normally retained in one of the openings 46 and will prevent rotation of the blades when the locking members are in locked position.

Adjacent the rollers 51 an annular member 55 is arranged for sliding movement. As shown, the member 55 has its inner face tapered and the tapered faces of the rollers 51 are adapted to engage this inner face. Adjacent its outer extremity the member 55 is connected to a plurality of operating rods 56 as indicated at 57, and these rods preferably extend to a point adjacent the pilot seat.

The rods 45 and 56 may be journaled for sliding movement through any suitable portion of the plane and in Figure 1, I have shown a plate 58 provided with bearings 59 for the rods. It is to be understood that the plate 58 merely designates any suitable portion of the plane in which bearings may be formed for the rods and applicant is not to be limited to the exemplification shown.

The operation of the pitch varying means and the locking means are as follows:

The locking members 48 are kept in locked position at all times except while the pitch of the propeller blades is being varied. The springs 53 normally urge the dogs 50 into the openings 46, but sliding movement of the annular member 55 away from the hub 12 will cause the ends of the locking members carrying the rollers 51 to move inwardly about the pivots 49 and thus disengage the dogs 50 from the openings 46.

While the locking members are in their disengaged positions, the yoke 44 can be moved to slide the sleeve 39 longitudinally on the shaft 10 and this movement of the sleeve will rotate the blades on their axes through the medium of the arms 37, rollers 38 and diagonal grooves 40.

After the pitch of the blades has been varied as desired, the annular member 55 is moved toward the hub 12 and the springs 53 will return the locking members to their locking positions and thus secure the blades whereby the pitch thereof will remain constant until again changed. The movement of the annular member 55 is, of course, through a limited space and when the springs return the dogs 50 to positions within the openings 46, the springs also urge the rollers 51 into contact with the inner face of the member 55 whereby but slight movement of the member 55 away from the hub is necessary to cause disengagement of the locking members.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In a propeller including a hub and a drive shaft secured thereto, blades carried by said hub, each blade having a stem provided with a squared portion, a sleeve mounted on said drive shaft and being provided with a plurality of diagonally arranged peripheral grooves, an arm secured at one end to each of said blades, each arm being provided with a squared opening in which the squared portion of said stems is arranged, a roller arranged on the opposite end of each arm each roller being movable in one of said grooves, means for sliding said sleeve longitudinally of said drive shaft whereby said rollers will be moved in said grooves to cause angular movements of said blades on their axes, and means for locking said blades in selected positions.

2. In a propeller including a hub and a drive shaft secured thereto, blades carried by said hub, each blade being provided with a group of spaced openings, a pivoted locking member associated with each blade and having one end normally engageable in locking position in selected openings in said groups, a roller carried on the opposite end of each locking member, a common means engageable with each of said rollers and movable to simultaneously cause pivotal movement of said locking members to disengage said first named ends of the latter from locking position, and means for returning said locking members to locking position.

3. A device constructed in accordance with claim 2 wherein said common means comprises an annular member having a tapered inner face, said rollers being in engagement with said inner face, said annular member being movable longitudinally of its axis, said means for returning said locking members to locking position also serving to retain said rollers in constant engagement with the inner face of said annular member during movement of the latter.

4. A device constructed in accordance with claim 2 wherein said last named means comprises a plurality of springs arranged between said hub and said locking members respectively.

In testimony whereof I affix my signature.

NEWEL C. JACKSON.